(12) United States Patent
Haldimann et al.

(10) Patent No.: US 8,397,154 B2
(45) Date of Patent: Mar. 12, 2013

(54) REMOTELY CONTROLLING A BROWSER PROGRAM

(76) Inventors: Luc Haldimann, Pratteln (CH); Philipp Bieri, Unterseen (CH); Simon Anderegg, Thun (CH)

( * ) Notice: Subject to any disclaimer, the term of this patent is extended or adjusted under 35 U.S.C. 154(b) by 166 days.

(21) Appl. No.: 12/663,395

(22) PCT Filed: Jun. 5, 2008

(86) PCT No.: PCT/CH2008/000251
§ 371 (c)(1),
(2), (4) Date: Dec. 7, 2009

(87) PCT Pub. No.: WO2008/148238
PCT Pub. Date: Dec. 11, 2008

(65) Prior Publication Data
US 2010/0223544 A1    Sep. 2, 2010

(30) Foreign Application Priority Data
Jun. 8, 2007    (CH) .......................... 911/07

(51) Int. Cl.
*G06F 17/00* (2006.01)
*G06F 3/00* (2006.01)
*G06F 3/048* (2006.01)

(52) U.S. Cl. .................. 715/205; 715/743; 715/851

(58) Field of Classification Search ............ 715/234, 715/205, 851, 743
See application file for complete search history.

(56) References Cited

U.S. PATENT DOCUMENTS

| | | | |
|---|---|---|---|
| 6,151,622 A * | 11/2000 | Fraenkel et al. .......... 709/205 |
| 6,360,250 B1 | 3/2002 | Anupam et al. | |
| 6,816,880 B1 * | 11/2004 | Strandberg et al. ........ 709/202 |
| 7,031,842 B1 * | 4/2006 | Musat et al. .................. 702/16 |
| 7,149,776 B1 | 12/2006 | Roy et al. | |
| 8,244,806 B2 * | 8/2012 | Arthur et al. ............... 709/204 |
| 2002/0138624 A1 * | 9/2002 | Esenther ....................... 709/227 |
| 2004/0139156 A1 * | 7/2004 | Matthews et al. .......... 709/204 |
| 2005/0038707 A1 * | 2/2005 | Roever et al. ................ 705/21 |
| 2006/0015763 A1 | 1/2006 | Nakajima | |

(Continued)

FOREIGN PATENT DOCUMENTS

EP    1 022 664 A2    7/2000

OTHER PUBLICATIONS

Boyaci et al.,"Application and Desktop Sharing", ACM, 2007, pp. 1-2.*

(Continued)

*Primary Examiner* — Doug Hutton, Jr.
*Assistant Examiner* — Soumya Dasgupta
(74) *Attorney, Agent, or Firm* — Brinks Hofer Gilson & Lione (57) ABSTRACT

A method for remotely controlling a browser program is executed on a source computer from a target computer. A browser program generates a browser window in which objects are displayed in a structurally coordinated manner, and simultaneously transmitted to the target computer. The objects are individually transmitted to the target computer and displayed on the target computer by a second browser program that is executed on the target computer. The second browser program generates a second browser window in which the objects are displayed. The objects are displayed in a structurally coordinated manner on both the source computer and the target computer, and can thus be efficiently controlled. There is no dependency between the display views of the objects on the source computer and the target computer with respect to the size and/or resolution of the browser window.

9 Claims, 4 Drawing Sheets

U.S. PATENT DOCUMENTS

| | | | |
|---|---|---|---|
| 2006/0053380 A1* | 3/2006 | Spataro et al. | 715/753 |
| 2006/0277463 A1* | 12/2006 | Mann et al. | 715/523 |
| 2006/0277499 A1* | 12/2006 | Britt et al. | 715/828 |
| 2007/0174759 A1* | 7/2007 | Ando et al. | 715/500.1 |
| 2008/0028323 A1* | 1/2008 | Rosen et al. | 715/752 |
| 2008/0307066 A1* | 12/2008 | Amidon et al. | 709/217 |
| 2009/0183088 A1* | 7/2009 | Saka | 715/751 |
| 2009/0307600 A1* | 12/2009 | Arthur et al. | 715/740 |

OTHER PUBLICATIONS

Aoki et al., "Collaborative Environment for Supporting Web Users," IEEE, pp. 2309-2316 (2001).

International Search Report dated Oct. 24, 2008 issued in related PCT Application No. PCT/CH2008/000251.

Fortier et al., "Interception Patterns", $10^{th}$ Conference on Pattern Languages of Programs 2003, pp. 1-16, Sep. 12, 2003, URL:http://www.hillside.net/plop/plop2003/Papers/Fortier-Interception.pdf, retrieved Dec. 16, 2009.

Esenther A. W. "Instant Co-Browsing: Lightweight Real-Time Collaborative Web Browsing," Mitsubishi Electric Research Laboratories, http://www.merl.com/papers/docs/TR2002-19.pdf, May 8, 2001, 11 pages.

* cited by examiner

REMOTELY CONTROLLING A BROWSER PROGRAM

TECHNICAL FIELD

The invention relates to a method according to the preamble of independent claim 1 as well as a communication device for carrying out the method of the invention and a computer program for carrying out the method of the invention.

Methods of this kind in which a browser program executed on a source computer generates a browser window in which objects are displayed in a structurally coordinated manner taking into account the design of the browser window and in which method the objects that are displayed in the browser window are simultaneously transmitted to a target computer and displayed on said target computer can be used for remotely controlling the browser program executed on the source computer from the target computer.

PRIOR ART

For finding, displaying and editing information on a computer or a computer network, often browser programs are used which are executed on the computer and operated by a user. The information is typically provided by a server service which is executed, for example, on a server computer that is remote from the computer and connected therewith via a communication network. For the browser program being able to display and edit the information in a predefined manner, the information is provided in a predefined format on the server service. Browser programs normally have a display module, wherein they reproduce the information either in mere text form in the display module or in graphically processed form.

As the Internet has spread out as world wide communication network, in particular also the World Wide Web System (WWW) has established all over the world. In the WWW server computers provide information via the Internet to other computers connected to the Internet, wherein the information is processed in such a standardized manner that it can be displayed and edited by a browser program carried out on a computer connected to the Internet. To this end, the browser program is configured such that it can receive, display and edit the information that is processed in a standardized manner and, if necessary, send information back to the server computer. For example, i.a. standards in view of the transmission protocols such as the Hypertext Transfer Protocol (HTTP) or the File Transfer Protocol (FTP), the markup languages such as the Hypertext Markup Language (HTML), and the graphic formats such as the format Joint Photographic Experts Group (JPG) or the format Graphics Interchange Format (GIF) have established in the WWW. Browser programs are available for a large variety of computer platforms, which each depend on different parameters such as the operating system, the hardware, the versioning etc. They are configured for the essentially equal standards so that the information that is processed in a standardized manner for the WWW can be provided in a manner that is substantially independent of the platform.

Typically, information provided in the WWW is organized on pages composed of different objects, said pages being defined and structured by means of a markup language. A browser program as described above can have an interpretation unit by means of which the browser program can analyze a page obtained from the network, for example the Internet, and display i.a. also the objects defined on the basis of the markup language in a structured manner in the display module. For allowing an improved interaction with a user of the browser program and for being able to execute page-specific program logics in the browser program, also standards in view of script programming languages, for example JavaScript, have established in the WWW. The interpretation unit of the browser program can typically also convert such a script language.

As the WWW becomes more and more important and corresponding pages become more and more complex, also the maintenance, support and control of the pages becomes more and more important nowadays. For example, for being able to assist and support the user of a page as efficiently as possible or also for carrying out other maintenance, support and control tasks, i.a. remote control software is nowadays used, by means of which software the browser program of a computer can be displayed on a control computer and operated by means of the control computer, for example by using its keyboard or its mouse. By means of such a remote control software, for example, the user of a page can be trained, supported and assisted on his/her own computer, without a supporting person having to be physically present at the location of the computer at the user of the page.

Known remote control software allows a computer to be controlled from a control computer. In this connection, typically all actions that can be carried out by the user of the computer himself/herself can be carried out on the computer, which normally extends considerably beyond maintenance, support and control of a browser program executed on a computer. For safety-related and other reasons, however, such an extensive control is often undesired or not admissible. Moreover, in known remote control software, normally at least part of the remote control software must be installed at least in the operating system of the computer. This installation of software for remotely controlling a page in the browser program, however, is in turn often undesired and too complex. Moreover, the remote control software to be installed on the computer must be adapted to all computer platforms that should be remotely controllable. Platform-dependent software, however, is normally related with much effort in view of development as well as maintenance and support.

Furthermore, there is also remote control software for browser programs which are not installed in the operating system of the computer but are transmitted into the browser program as embedded objects together with a page. Such embedded objects are not interpreted and/or executed by the browser program itself but by a third-party program started via the browser program. Such likewise standardized third-party programs, for example the Java Runtime Engine (JRE) or the ActiveX components, which allow programs to be carried out substantially independent of a platform, however, have to be installed themselves in the operating system of the computer. However, since the installation of third-party programs and in particular also the execution of embedded objects by means of a third-party program can partly be relevant in view of safety, corresponding embedded objects are often undesired and/or inadmissible.

In the kinds of remote control software described above, normally screen images of the display of the graphic display terminal of the computer, for example a monitor, or parts thereof, for example a browser window of a browser program, are transmitted to the control computer and displayed on the control computer. The computer is normally operated from the control computer via the keyboard of the control computer and graphically via the movement of a pointer, for example by means of a mouse, via the screen image displayed on the control computer. To this end, coordinates of the screen image are linked with coordinates of the display of the graphic display terminal so that a movement on the screen image can be transformed into a movement on the graphic display terminal and, if need be, also vice versa. The screen images generated similar to a photographic display of the graphic display terminal, however, can lead to difficulties in connection with display and operation. For example, the resolution and/or the size of the display on the computer and the resolution and/or size of the display on the control computer can be different so that objects which are displayed in a structurally coordinated manner in the display on the computer can be invisible or visible in a poor quality in the display on the control computer and can lose the structure and coordination relative to one another.

Figure 1:
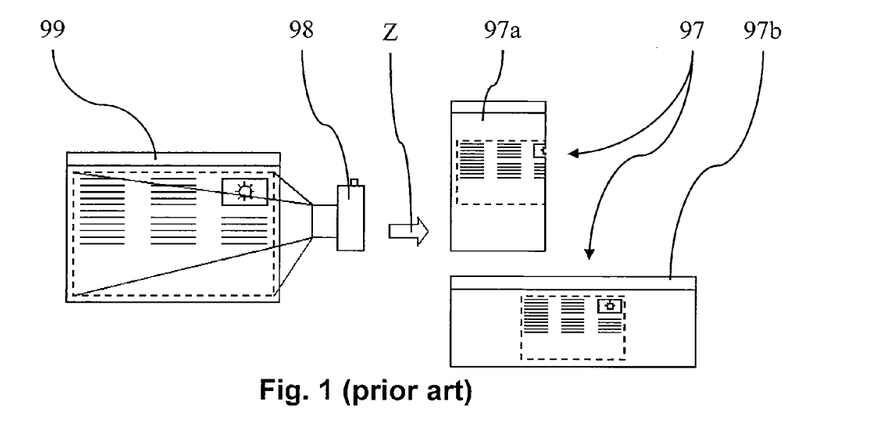
FIG. 1 shows a functional diagram of an embodiment of a known method for remotely controlling a browser program executed on a source computer from a target computer (prior art)

In FIG. 1 it is exemplarily shown in this connection how the content of a browser window 99 of a browser program is put down photographically by a screen image generation module 98 of a remote control software and then, as indicated by arrow Z, transmitted as a screen image to the control computer. On the control computer, the screen image is then displayed, for example, in a window 97. Here, the resolution or the size of the browser window 99 as compared to the resolution or the size of the window 97 is decisive for the quality of the display and operability on the control computer. For example, because of a different resolution or size, the screen image of the browser window 99 cannot be displayed completely in the window 97a, so that a part of this screen image is not directly visible and accessible. In window 97b it is shown as a further example that the screen image is reduced in size for being able to be fitted into the window 97b. Both examples, like many other corresponding scenarios in connection with different resolutions and/or sizes of the browser window on the computer and the window on the control computer make the remote control of the browser program executed on the computer much more difficult on the control computer.

Therefore, it is an object of the following invention to suggest a method for remotely controlling a browser program, in which the browser program executed on a computer can be displayed in an improved manner and operated more easily on a control computer.

DESCRIPTION OF THE INVENTION

According to the invention, the object is achieved by a method characterized by the features of the independent claim. Advantageous embodiments of the method of the invention can be taken from the features of the dependent claims.

The gist of the invention is the following: In a method for remotely controlling a browser program executed on a source computer from a target computer, wherein the browser program generates a browser window in which objects are displayed in a structurally coordinated manner taking into account the design of the browser window, the objects that are displayed in the browser window are simultaneously transmitted to the target computer and displayed on the target computer. The objects or properties thereof are individually transmitted to the target computer and displayed on the target computer by means of a second browser program that is executed on the target computer, wherein the second browser program generates a second browser window in which the objects are displayed in a structurally coordinated manner taking into account the design of the second browser window. Since the objects or the properties thereof, which are defined, for example, by means of a markup language and/or a script language such as the Hypertext Markup Language (HTML) or JavaScript, respectively, are simultaneously transmitted individually to the target computer and displayed thereon by the second browser program, it can be guaranteed that the objects are displayed in a structurally coordinated manner on both the source computer and the target computer and, therefore, can be operated efficiently. The "individual transmission" of the objects to the target computer relates in particular to a transmission independent of the situation on the source computer, for example the set resolution of a monitor connected to the source computer or the set size of the browser window on the source computer. Furthermore, the "individual transmission" relates in particular also to a transmission of properties of the objects, so that according to the invention it is not urgently necessary to transmit entire objects. Thus, there is no dependency in view of the display of the objects on the source computer and on the target computer, in particular in terms of the size and/or resolution of the browser window. The design of the browser window is defined, i.a. by its width, its height, the resolution of the monitor and the preset browser standards such as the standard font or the standard colors.

Moreover, by means of the method of the invention it can also be guaranteed that the objects on the source computer and on the target computer correlate with one another so that any action relevant to the objects, for example a change in the property of an object, in the browser program of the source computer can also be performed on the target computer, so that the browser program of the source computer can easily be remotely controlled.

The method of the invention allows and simplifies various applications of the remote control of browser programs. For example, an operator of a page in the World Wide Web System (WWW) can effectively support and/or train a user of the page without being hindered or restricted by the situation on the computer of the user, for example the set resolution of a monitor of the user or the set size of the browser window on the monitor of the user. Or for evaluating and improving the user guidance of a page comprising the objects, for example, the actions performed by a user of the source computer or the target computer on the browser program while the page is displayed by the browser program can be recorded and stored.

Preferably, also the objects displayed in the second browser window are at least partly transmitted individually simultaneously to the source computer and displayed by means of the browser program executed on the source computer in a structurally coordinated manner taking into account the design of the browser window. By using such a method, the browser program on the source computer can be remotely controlled interactively in that the objects can additionally be controlled also on the target computer, are simultaneously transmitted to the source computer and displayed on the source computer. Such a method is, for example, suitable for remotely supporting the user of a browser program executed on the source computer in that it is possible to control the browser program of the source computer directly from the target computer.

In a preferred embodiment, the browser program and the second browser program each comprise an interpretation unit for evaluating a markup language and for executing script commands. The remote control of the browser program executed on a source computer is executed completely by the interpretation unit of the browser program and the interpretation unit of the second browser program. Thus, the browser program of the source computer can be remotely controlled without the need for any installation in the operating system of the source computer. For example, each browser program for the WWW comprises such an interpretation unit which can evaluate HTML as markup language and execute script commands in the script language JavaScript. When installing the browser program for the WWW in the operating system of the source computer or the second browser program for the WWW in the operating system of the target computer, typically the respective interpretation units, by means of which pages comprising HTML and JavaScript can be executed, are necessarily being installed as well. For remotely controlling the browser program, thus no further installation is necessary because the entire functionality that is necessary for this purpose is transmitted to the source computer as script commands (JavaScript commands) together with the markup language (HTML) in the page.

Such a realization of the method by means of script commands executed in the interpretation unit of the browser program of the source computer and in the interpretation unit of the browser program of the target computer also allows the execution of a different generic method for remotely controlling a browser program. Here, it is not necessary that the objects are transmitted individually to the target computer and displayed on the target computer by means of a second browser program executed on the target computer, wherein the second browser program generates a second browser window in which the objects are displayed in a structurally coordinated manner taking into account the design of the second browser window. Rather, in this manner, for example, also the prior art method described above and shown exemplarily in FIG. 2 can be carried out without a further installation in addition to the installation of the browser program itself being necessary for remotely controlling the browser program.

Preferably, a page which comprises a markup language and is transmitted to the source computer is displayed and executed by means of the browser program, wherein script commands for remotely controlling the browser program executed on the source computer are added to the page before transmission to the source computer. For example, the page provided by a server service for the browser program of the source computer can be extended in advance by script commands, for example in JavaScript. The page is then transmitted to the source computer together with the functionality for the ability to be remotely controlled.

Various script commands, which are used for executing pages, display objects outside the browser window of the browser program in which they are executed. These objects then can no longer be controlled and particularly remotely controlled by script commands of the page displayed in the browser window of the browser program. For example, certain JavaScript commands such as, i.a., the command alert( ) generate an external dialog window which cannot be controlled by JavaScript commands of the page itself. In the remote control of browser programs, this leads to the fact that the control of the browser program on the source computer is lost as soon as such a dialog window is being opened and the pointer, which is controlled, for example, by means of a mouse, is located on this dialog window. In order to avoid this, in the method of the invention preferably a corresponding script command for executing the page is replaced before the page is transmitted to the source computer by a script command for remotely controlling the browser program executed on the source computer. Thus, the script command for executing the page, for example alert( ) is replaced such that the script command for the remote control, for example alert_replaced( ) takes over the same functionality in the browser window itself as the script command for executing the page.

Moreover, objects forming a page partially also comprise embedded objects. Such embedded objects are transmitted together with the page to the source computer and executed by a third-party program executed on the source computer in the browser window of the browser program. The third-party programs themselves—in the WWW, for example, the Java Runtime Engine (JRE) or ActiveX components are used as third-party programs—are installed in the operating system of the source computer. The embedded objects, for example Java applets, however, are not installed in the operating system of the source computer but executed by the third-party program in the browser window of the browser program. Such embedded objects executed in the browser window of the browser program, however, likewise cannot be controlled and particularly remotely controlled by script commands of the page displayed in the browser window of the browser program. When remotely controlling browser programs, this leads to the fact that the control via the browser program on the source computer is lost as soon as such an embedded object is displayed in the browser window and the pointer, which is controlled, for example, by means of a mouse, is located on this embedded object. In order to avoid this, in the method of the invention, in which a page comprising an embedded object and having been transmitted to the source computer is displayed and executed in the browser window by means of the browser program and a third-party program executed on the source computer, wherein the embedded object is displayed and executed by the third-party program, the embedded object is extended before transmission to the source computer so that it can be remotely controlled. Thus, the page can be remotely controlled as a whole even if it comprises an embedded object.

In a further advantageous embodiment of the method of the invention, by means of the browser program, a server page comprising a markup language, script commands for executing the page and script commands for remotely controlling the browser program executed on the source computer is displayed and executed on the source computer and a client page comprising a markup language and script commands for remotely controlling the browser program executed on the source computer is transmitted to the target computer and displayed and executed on the target computer. Such a realization of the method allows, for example, the operator of a page comprising the objects and further objects to operate himself/herself the source computer as server computer. The further objects can comprise, for example, script programs with application logic, which have relatively high demands on the source computer for guaranteeing a smooth operation, or objects which cannot be transmitted to the target computer for technical reasons or safety reasons. The objects are then displayed on the target computer, however, the actions performed with them are executed on the source computer. Such a server-side browser system allows the browser program of the target computer and target computer to be realized in a relatively low-power manner and nevertheless guarantee a high functionality of the page. For example, it is possible with such a server-side browser system to use relatively low-power devices, for example a mobile phone, as target computer and nevertheless provide the entire functionality of a device having more power. It can be a further application of this server-side browser system to allow users of a plurality of target computers to simultaneously display and simultaneously edit the page on the source computer.

However, also by means of the second browser program, an object of the client page can be changed on the target computer, the changed object can be transmitted to the source computer and stored by means of the source computer. Thus, the server page can be adapted and stored by a user of the target computer so that it can be again available to him/her or also to users of other target computers.

A further aspect of the invention relates to a computer program which extends a page which comprises objects being defined by means of a markup language by script commands for remotely controlling a browser program executed on a source computer so that the method described above can be executed by means of the extended page. By means of such a computer program, conventional pages can be rendered remotely controllable in an automated manner, without the need to take into consideration when originally designing the page that it should be remotely controllable during operation.

A different further aspect of the invention relates to a communication device which comprises an editing service and a server service, from which a page comprising objects that are defined by means of a markup language can be transmitted to a source computer. Here, the editing service extends the page before transmission to the source computer by script commands for remotely controlling a browser program executed on the source computer so that the method described above can be executed by means of the extended page. The server service can be executed, for example, on a server computer which provides the page via the Internet. The editing service can be executed either on the same server computer or on a second server computer. During operation, the server service is contacted by the browser program of the source computer, and the server service then transmits the page to the source computer. The transmitted page is adapted such by the editing service that it comprises the functionality in form of script commands, so that the browser program of the source computer is remotely controllable while the page is displayed and operated in the browser window of the browser program of the target computer. The editing service preferably comprises the computer program described above. Such an editing service can guarantee that the page can be easily prepared and maintained without taking into consideration the browser program's ability to be remotely controlled and that the page is nevertheless adapted automatically such during its transmission that the browser program of the source computer is remotely controllable.

BRIEF DESCRIPTION OF THE DRAWINGS

In the following, the method of the invention, the computer program of the invention and the communication device of the invention are described in more detail with reference to the attached drawings on the basis of embodiments. It is possible to realize further variants of these embodiments that are described in more detail.

WAY(S) FOR CARRYING OUT THE INVENTION

Figure 2:
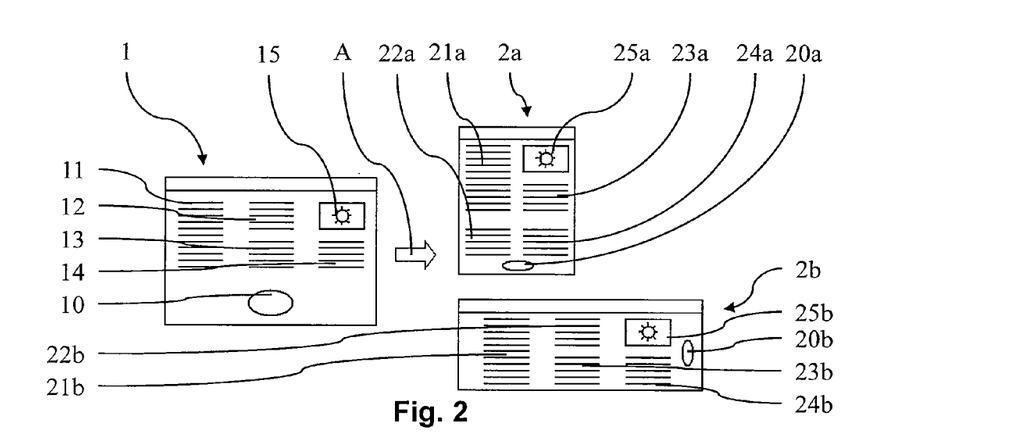
FIG. 2 shows a functional diagram of a first embodiment of the method of the invention.

FIG. 2 shows a first embodiment of the method of the invention for the World Wide Web Service (WWW). A browser program which generates on a monitor a browser window 1 for displaying a page obtained via the Internet is executed on a source computer. The page comprises a plurality of user interface objects which are defined by means of a markup language (HTML) and by means of script commands (JavaScript) and comprise a first text block 11, a second text block 12, a third text block 13, a fourth text block 14 as well as a graphic 15. The user interface objects are displayed in three columns in the browser window 1 in a structurally coordinated manner taking into account the design of the browser window 1, wherein the first text block 11 is displayed in a first column, the second text block 12 and the third text block 13 are displayed in a second column and the graphic 15 and the fourth text block 14 are displayed in a third column.

Moreover, the page displayed in the browser window 1 comprises a remote control object 10 comprising JavaScript commands for remotely controlling the browser program executed on the source computer. The remote control object 10 is not visibly displayed in the browser window and its JavaScript commands can be executed via a standardized interpretation unit of the browser program. By means of the remote control object 10, the user interface objects are, on the one hand, transmitted to a target computer, as indicated by arrow A, and, on the other hand, they are controllable and remotely controllable via them. The target computer executes a second browser program which displays a second page corresponding to the page via a second browser window 2a or 2b on a monitor. The second page comprises user interface objects which are defined by means of HTML and by means of JavaScript commands and which are displayed depending on the design of the second browser window 2a or 2b.

For example, the browser window 2a as a relatively large height and a relatively small width. Accordingly, the user interface objects of the second page, which comprise a first text block 21a, a second text block 22a, a third text block 23a, a fourth text block 24a as well as a graphic 25a, are displayed by the second browser program in the second browser window in a structurally coordinated manner. In the embodiment of the second browser window 2a, which is exemplarily shown in FIG. 2, the user interface objects are arranged in two columns, wherein the first text block 21a and the second text block 22a are displayed in a first column and the graphic 25a, the third text block 23a and the fourth text block 24a are displayed in the second column.

In a further example shown in FIG. 2, the browser window 2b has a relatively small height and a relatively large width. Accordingly, the user interface objects of the second page, which comprise a first text block 21b, a second text block 22b, a third text block 23b, a fourth text block 24b as well as a graphic 25b, are displayed by the second browser program in the second browser window in a structurally coordinated manner in three columns. Here, the first text block 21b is displayed in a first column, the second text block 22b and the third text block 23b are displayed in a second column, and the graphic 25b and the fourth text block 24b are displayed in a third column.

Moreover, the second page displayed in the second browser window 2a or 2b comprises a remote control object 20a or 20b, respectively, which is not visibly displayed in the respective browser window 2a or 2b and which comprises JavaScript commands for remotely controlling the browser program executed on the source computer. During the remote control, the user interface objects of the browser window 1 of the source computer are monitored by event handlers that are contained as a standard in JavaScript, and in case an event occurs, a corresponding action is triggered in the second browser window 2a or 2b on the target computer. For example, movements of a pointer, which is normally operated by means of a mouse, are detected on a user interface object, for example on the text block 11, by means of the event handlers, transmitted to the target computer and displayed on the corresponding user interface object, for example the text block 21a or 21b, in the second browser window 2a or 2b, respectively. The events that are transmitted in such a manner and trigger actions comprise all events relating to the user interface objects such as, i.a., pointer movements, mouse clicks and input in form fields.

Analogously, also the user interface objects of the second browser window 2a or 2b of the target computer are monitored by event handlers that are contained as a standard in JavaScript, and in case an event occurs, a corresponding action is triggered in the browser window 1 on the source computer. In this manner, the browser program of the source computer can be remotely controlled from the target computer, while a page is displayed in the browser window 1 of the source computer. A correlation between the individual user interface objects of the source computer and the user interface objects of the target computer is generated, by means of which correlation the browser program 1 of the source computer can be remotely controlled from the target computer in a comfortable manner independent of the design of the browser window 2a or 2b of the target computer.

The following is stipulated for the entire further description. If a Figure comprises reference numbers for the sake of illustrative clarity and if these reference numbers are not mentioned in the directly corresponding description text, reference is made to the explanation of these reference numbers in previous Figure descriptions.

Figure 3:
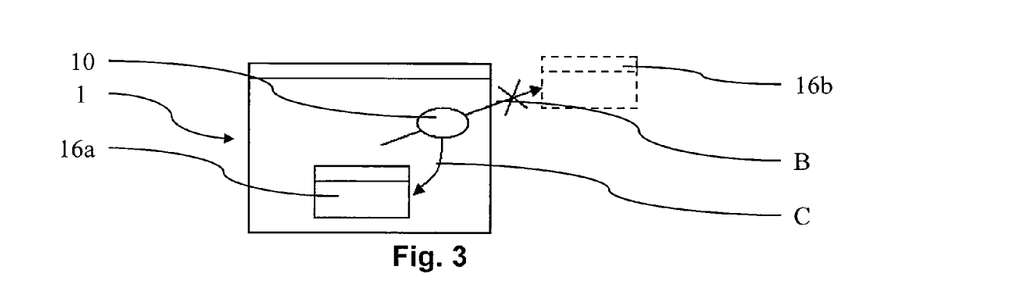
FIG. 3 shows a functional diagram of the method of FIG. 2 during replacement of a script command for executing a page before transmitting the page to a source computer.

As shown in FIG. 3, in the first embodiment of the method of the invention it is possible that the browser program of the source computer remains remotely controllable even if a JavaScript command, which generates an object displayed outside the browser window 1, is executed therein for executing the page. To this end, all corresponding JavaScript commands for executing the page are replaced by adapted JavaScript functions, wherein the adapted JavaScript functions generate the same functionalities in the browser window 1 itself as the JavaScript commands outside the browser window. For example, the JavaScript command for generating a dialog window 16b is replaced by an adapted JavaScript function defined in the remote control object 10. Thus, as indicated by arrow B, not the standard JavaScript dialog window outside the browser window 1 is generated but, as indicated by arrow C, the same dialog window in the browser window 10 itself. Thus, the page remains controllable and, therefore, also the browser program remains remotely controllable.

Figure 4:
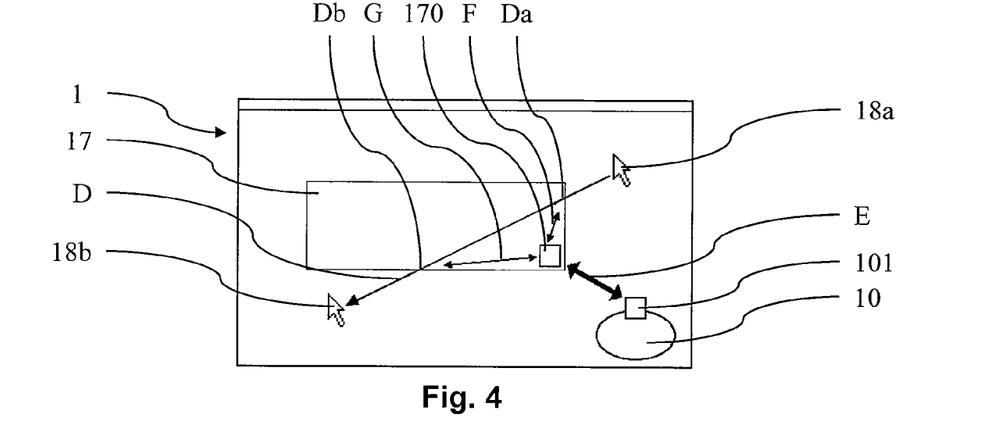
FIG. 4 shows a functional diagram of the method of FIG. 2 during a control of an embedded object of the page.

As shown in FIG. 4, the browser program can also be remotely controlled if the page displayed in its browser window comprises an embedded object 17, for example a Java applet. The latter is executed by means of a third-party program installed in the operating system of the source computer, for example the Java Runtime Engine (JRE), in the browser window 1 of the source computer. For this purpose, on the one hand, an additional remote control object 170 is added to the embedded object 17 as program part before transmission of the page to the source computer. On the other hand, the remote control object 10 of the page comprises a sub-object 101 comprising script commands for interaction and evaluation of the additional remote control object 170. For example, if the pointer 18a is moved over the embedded object 17 on the display of the source computer, as indicated by arrow D, the additional remote control object 170 interacts with the sub-object 101, as indicated by arrow E, as soon as the pointer 18a is located over the embedded object 17, as indicated by point Da and arrow F. Here, it transmits to the sub-object 101 the information necessary for the remote control. The additional remote control object 170 loses control of the pointer 18b as soon as the latter is no longer located over the embedded object 17, as indicated by point Db and arrow G.

Figure 5:
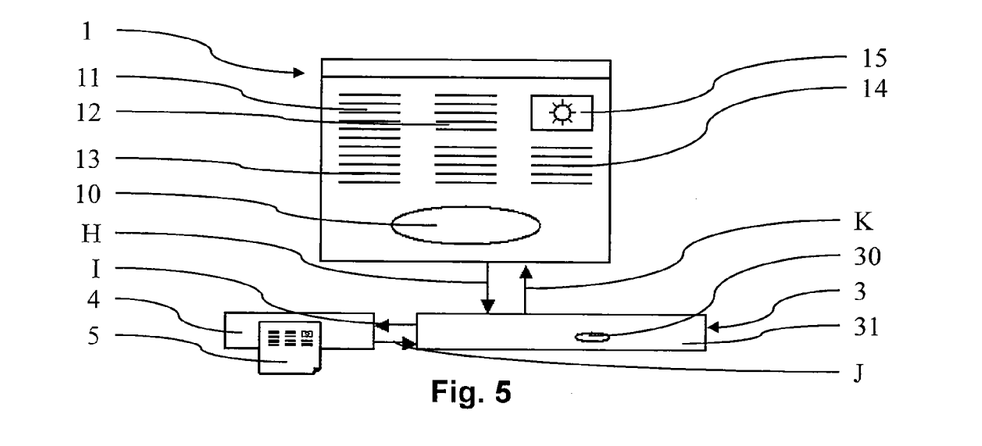
FIG. 5 shows a functional diagram of an embodiment of a technical realization of the method of FIG. 2 during a transmission of a page from a server computer to the browser program of the source computer.

As shown in FIG. 5, the method of the invention can be realized technically by means of a communication device comprising an editing service 3 and a server service realized as a web server 4. The editing service 3 and the web server 4 can be executed on the same server computer or also on separate server computers. An original page 5 is provided on the web server 4 in a known manner for access via the Internet by an operator. A request of the browser program of the source computer is made, as indicated by arrow H, via an interface 31 of the editing service 3 and is transmitted by said editing service 3 to the web server 4, as indicated by arrow I. The web server 4 transmits, as indicated by arrow J, the original page 5 to the interface 31, which adds a remote control object 30 to the original page 5. The resulting page is, as indicated by arrow K, transmitted to the browser program, which displays the user interface objects of the page in the manner described above.

Figure 6:
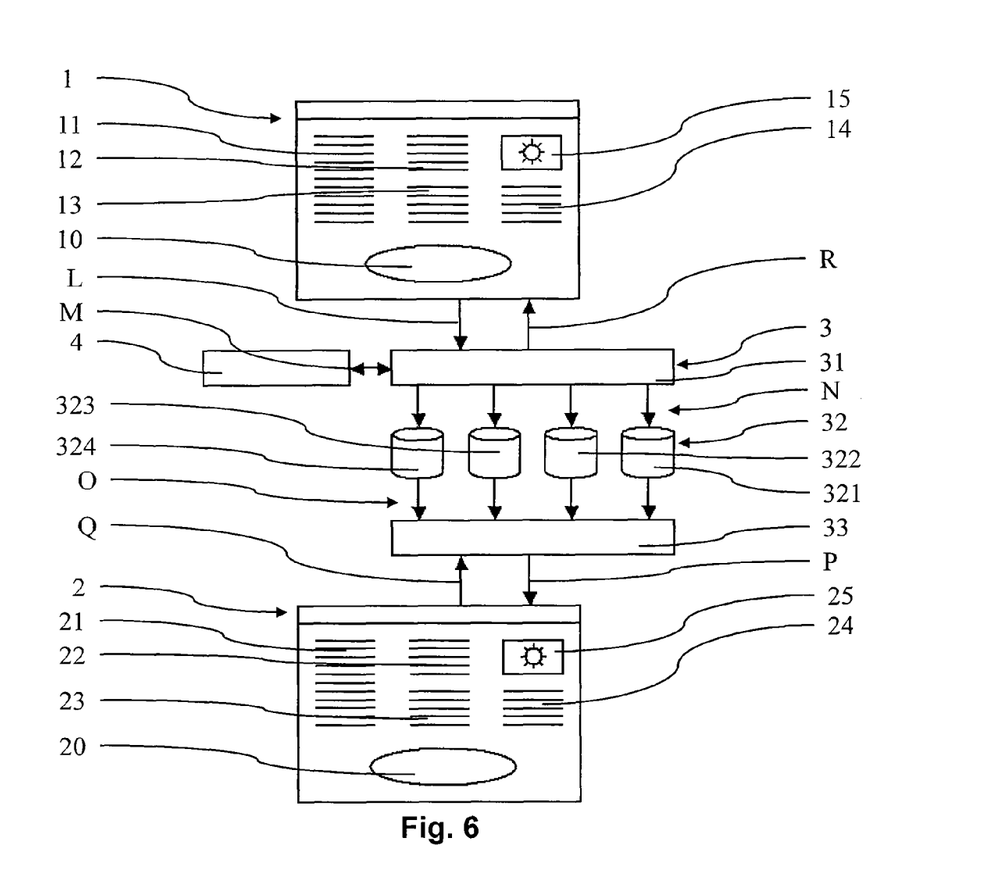
FIG. 6 shows a functional diagram of the technical realization of FIG. 4 during an interaction of the browser program of the source computer with the browser program of the target computer.

As shown in FIG. 6, the communication device further comprises a second interface 33 and a plurality of data bases 32 comprising an action data base 321, a content data base 322, a file data base 323 and a user data base 324. After the original page 5 has been transmitted and edited to the page displayed in the browser program of the source computer, for the remote control the page is, as described above, also displayed by the second browser program in a browser window 2 of the target computer. Here, both the user interface objects, i.e. the first text block 21, the second text block 22, the third text block 23, the fourth text block 24 and the graphic 25, are displayed in the second browser window 2, and also the second remote control object 20 is provided in the second browser program. During remote control, the events described above are transmitted to the interface 31, as indicated by arrow L, wherein, as indicated by arrow M, it can be checked on the web server 4 for updating purposes whether the page displayed in the browser window 1 should be adapted. As indicated by arrows N, all information belonging to one of the events is stored in the respective data base 32 intended for this purpose. As indicated by arrows O, these objects are then edited by the second interface 33 in such a manner that, as indicated by arrow P, an action corresponding to the event is executed in the second browser window 2 of the target computer. The same kind of event transmission can, as indicated by arrow Q, also take place in the opposite direction from the target computer to the source computer. By means of the data base 32, all events occurring on the page displayed in the browser window 1 of the source computer and on the second page displayed in the browser window 2 of the target computer can be stored and also reproduced.

Figure 7:
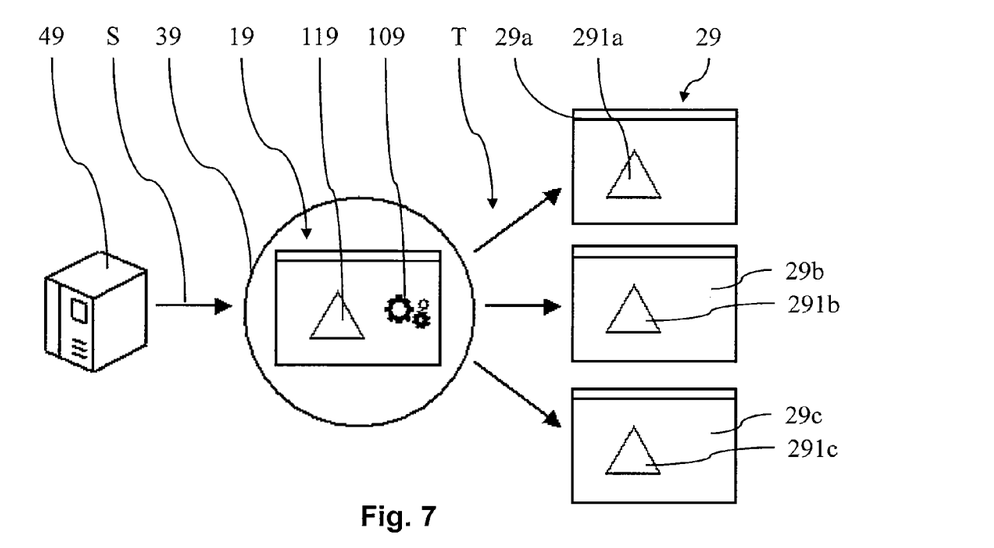
FIG. 7 shows a functional diagram of a second embodiment of the method of the invention.

In the embodiment of the method of the invention as shown in FIG. 7, upon calling a page on a server 49, the page is displayed, as indicated by arrow S, by an editing service 39 by means of a browser program executed on a server computer as source computer in a browser window 19 as server page. In addition to objects 119 comprising user interface objects and a remote control object, the page comprises a logic object 109 comprising JavaScript commands for executing the page. As indicated by arrow T, the page is then displayed in a plurality of browser windows 29 by browser programs of target computers, wherein only the objects 291a or 291b or 291c are transmitted to the browser programs and displayed in the respective browser window 29a or 29b or 29c. By means of this embodiment of the method of the invention, the entire program logic defined in the logic object, which, if need be, can claim considerable resources, can be executed on the server. Accordingly reduced demands are placed on the efficiency of the target computers.

Figure 8:
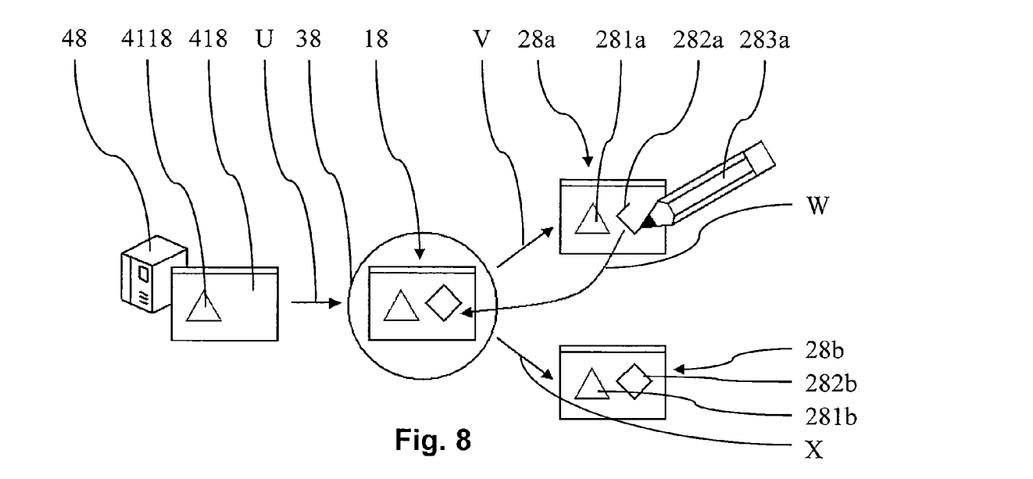
FIG. 8 shows a functional diagram of a third embodiment of the method of the invention.

FIG. 8 shows an embodiment of the method of the invention in which a server 48 provides an original page 418. The original page 418 comprises objects 4118 comprising user interface objects. As indicated by arrow U, upon a corresponding request by a browser program of a target computer, the page is transmitted to an editing service 38 and by means of the editing service 38 and by using a browser program executed on a server computer as source computer displayed and edited as server page in a browser window 18. As indicated by arrow V, the edited page is transmitted to a first browser program which displays the objects 281a in a browser window 28a as client page on a target computer. By means of an adapting instrument 283a, a further object 282a is added to the page on the target computer and then transmitted back to the editing service 38, as indicated by arrow W. As indicated by arrow X, the page together with the further object is transmitted to a browser program of a further target computer, which afterwards asks for the page via the editing service. The browser program of the further target computer then displays the page with both the objects 281b and the further object 282b as client page in a browser window 28b.

Although the invention is depicted and described in detail on the basis of the Figures and the corresponding description, this depiction and detailed description are considered as being illustrative and exemplary and not as restricting the invention. Experts can of course make changes and modifications without leaving the scope and spirit of the following claims. In particular, the invention also comprises embodiments comprising any combination of features mentioned or shown above or below in connection with different embodiments.

The invention also comprises individual features in the Figures, even if they are shown therein in connection with other features and/or if they are not mentioned above or below.

Moreover, the term "comprise" and derivations thereof do not exclude other elements or steps. Furthermore, the indefinite article "a" and derivations thereof do not exclude a plurality. The functions of a plurality of features mentioned in the claims can be fulfilled by a unit. A computer program can be stored and/or distributed on a suitable medium, for example on an optical storage medium or a hard medium provided together with or as part of other hardware. It can also be distributed in other form, for example via the Internet or other wired and unwired telecommunication systems. All reference numbers in the claims are not considered as restricting the scope of the claims.

The invention claimed is:

1. A method for remotely controlling a first browser program executed on a first computer, from a second computer, the method comprising:

generating by the first browser program, a first browser window in which objects are displayed in a structurally coordinated manner in accordance with the first browser window, where objects that are displayed in the first browser window are simultaneously transmitted to the second computer and are displayed on the second computer;

transmitting the objects individually to the second computer wherein the objects are displayed on the second computer by a second browser program that is executed on the second computer;

wherein the second browser program generates a second browser window in which the objects are displayed in a structurally coordinated manner in accordance with the second browser window;

wherein the first browser program and the second browser program each comprise an interpretation unit for evaluating a markup language and for executing script commands, and the remote control of the first browser program that is executed on the first computer is executed completely by the interpretation unit of the first browser program and by the interpretation unit of the second browser program, wherein the entire functionality necessary for the remote control of the first browser program is transmitted to at least the first computer or to the first computer and the second computer, within the markup language and the script commands;

wherein a page which comprises markup language and is transmitted to the first computer is displayed and executed by the first browser program;

wherein script commands for remotely controlling the first browser program that is executed on the first computer are added to the page before transmission to the first computer;

wherein the page comprises script commands for executing the page; and wherein before transmission to the first computer, at least one of the script commands for executing the page is replaced by a corresponding script command for remotely controlling the first browser program that is executed on the first computer.

2. The method according to claim 1, wherein the objects that are displayed in the second browser window are at least partly transmitted individually and simultaneously to the first computer, and displayed by the first browser program that is executed on the first computer, in a structurally coordinated manner in accordance with the first browser window.

3. The method according to claim 1, the method further comprising displaying and executing in the first browser window, by means of the first browser program and a third-party program that is executed on the first computer, a page which comprises an embedded object and has been transmitted to the first computer, wherein the embedded object is displayed and executed by the third-party program and wherein the embedded object is extended before being transmitted to the first computer so that it is remotely controllable.

4. The method according to claim 1, further comprising displaying and executing on the first computer, by means of the first browser program, a server page that comprises a markup language, script commands for executing the page and script commands for remotely controlling the browser program executed on the first computer, wherein a client page comprising a markup language and script commands for remotely controlling the first browser program executed on the first computer is transmitted to the second computer and displayed and executed on the second computer.

5. The method according to claim 4, wherein the second browser program changes an object of the client page on the second computer, and the changed object is transmitted to the first computer and is stored by the first computer.

6. The method according to claim 1, wherein a computer program is executed by means of an extended page, wherein the extended page comprises objects that are defined by a markup language and by script commands for remotely controlling the first browser program executed on the first computer.

7. The method according to claim 1, wherein a communication device comprising an editing service and a server service executed on a server computer, from which a page that comprises objects defined by a markup language, are transmitted to the first computer, wherein the editing service extends the page before transmission to the first computer by script commands for remotely controlling the first browser program executed on the first computer.

8. The method according to claim 1, wherein the interpretation unit of the first browser program and the interpretation unit of the second browser program are standardized interpretation units.

9. The method according to claim 1, wherein in instances when the replaced script commands for executing the page generate an object displayed outside of the first browser window, the script command for remotely controlling the first browser program that is executed on the first computer comprises adapted JavaScript functions which generate same functionalities as the replaced script command, inside the first browser window.

* * * * *